United States Patent
Johnston et al.

(10) Patent No.: US 7,665,130 B2
(45) Date of Patent: Feb. 16, 2010

(54) SYSTEM AND METHOD FOR DOUBLE-CAPTURE/DOUBLE-REDIRECT TO A DIFFERENT LOCATION

(75) Inventors: Keith Johnston, Austin, TX (US); Eric White, 1717 Bartoncliff Dr., Austin, TX (US) 78704; John Martin, Austin, TX (US)

(73) Assignee: Eric White, Austin, TX (US)

( * ) Notice: Subject to any disclaimer, the term of this patent is extended or adjusted under 35 U.S.C. 154(b) by 944 days.

(21) Appl. No.: 11/076,646

(22) Filed: Mar. 10, 2005

(65) Prior Publication Data

US 2005/0204168 A1    Sep. 15, 2005

Related U.S. Application Data

(60) Provisional application No. 60/551,705, filed on Mar. 10, 2004, provisional application No. 60/551,702, filed on Mar. 10, 2004.

(51) Int. Cl.
*H04L 29/02* (2006.01)
(52) U.S. Cl. .............................. 726/12; 726/5
(58) Field of Classification Search ........................ None
See application file for complete search history.

(56) References Cited

U.S. PATENT DOCUMENTS

| | | |
|---|---|---|
| 5,673,393 A | 9/1997 | Marshall et al. |
| 5,706,427 A | 1/1998 | Tabuki |
| 5,748,901 A | 5/1998 | Afek et al. |
| 5,878,231 A | 3/1999 | Baehr et al. |
| 5,896,499 A | 4/1999 | McKelvey |

(Continued)

FOREIGN PATENT DOCUMENTS

EP    0587522 B1    1/2000

(Continued)

OTHER PUBLICATIONS

Crandell et al., "A Secure and Transparent Firewall Web Proxy", Oct. 2003, Usenix, Retrieved from the Internet on Jul. 15, 2009: <URL: http://www.usenix.org/event/lisa03/tech/full_papers/crandell/crandell.pdf>.*

(Continued)

*Primary Examiner*—Minh Dinh
(74) *Attorney, Agent, or Firm*—Sprinkle IP Law Group

(57) ABSTRACT

A system and method of providing network access comprising a processor, a first network interface coupled to the processor, a second network interface coupled to the processor, a storage media accessible by the processor and a set of computer instructions stored on the storage media, executable by the processor, where the computer instructions can be executable to receive a network communication over the first network interface from a user using a user device and determine if the network communication is associated with an authenticated user. If the network communication is not associated with an authenticated user, is not destined for a server in a walled garden, and a pre-authentication interface is specified, the computer instructions can be executable to direct the user to the pre-authentication interface. The computer instructions can be further executable to direct the user to an authentication interface when the network communication is not associated with an authenticated user, is not destined for a server in the walled garden, and a pre-authentication interface is not specified.

6 Claims, 2 Drawing Sheets

U.S. PATENT DOCUMENTS

| | | |
|---|---|---|
| 5,901,148 A | 5/1999 | Bowen et al. |
| 5,936,542 A | 8/1999 | Kleinrock et al. |
| 5,953,506 A | 9/1999 | Kalra et al. |
| 5,987,134 A | 11/1999 | Shin et al. |
| 5,996,013 A | 11/1999 | Delp et al. |
| 6,085,241 A | 7/2000 | Otis |
| 6,088,451 A | 7/2000 | He et al. |
| 6,092,200 A | 7/2000 | Muniyappa et al. |
| 6,108,782 A | 8/2000 | Fletcher et al. |
| 6,130,892 A | 10/2000 | Short et al. |
| 6,131,116 A | 10/2000 | Riggins et al. |
| 6,157,953 A | 12/2000 | Chang et al. |
| 6,173,331 B1 | 1/2001 | Shimonishi |
| 6,176,883 B1 | 1/2001 | Holloway et al. |
| 6,185,567 B1 | 2/2001 | Ratnaraj et al. |
| 6,194,992 B1 | 2/2001 | Short et al. |
| 6,199,113 B1 * | 3/2001 | Alegre et al. ............... 709/229 |
| 6,205,552 B1 | 3/2001 | Fudge |
| 6,212,558 B1 | 4/2001 | Antur et al. |
| 6,219,706 B1 | 4/2001 | Fan et al. |
| 6,233,607 B1 | 5/2001 | Taylor et al. |
| 6,243,815 B1 | 6/2001 | Antur et al. |
| 6,275,693 B1 | 8/2001 | Lin et al. |
| 6,295,294 B1 | 9/2001 | Odlyzko |
| 6,321,339 B1 | 11/2001 | French et al. |
| 6,324,648 B1 | 11/2001 | Grantges, Jr. |
| 6,336,133 B1 | 1/2002 | Morris et al. |
| 6,404,743 B1 | 6/2002 | Meandzija |
| 6,421,319 B1 | 7/2002 | Iwasaki |
| 6,463,474 B1 | 10/2002 | Fuh et al. |
| 6,473,793 B1 | 10/2002 | Dillon et al. |
| 6,473,801 B1 | 10/2002 | Basel |
| 6,477,143 B1 | 11/2002 | Ginossar |
| 6,502,131 B1 | 12/2002 | Vaid et al. |
| 6,516,417 B1 | 2/2003 | Pegrum et al. |
| 6,535,879 B1 | 3/2003 | Behera |
| 6,539,431 B1 | 3/2003 | Sitaraman et al. |
| 6,636,894 B1 | 10/2003 | Short et al. |
| 6,678,733 B1 * | 1/2004 | Brown et al. ............... 709/229 |
| 6,708,212 B2 | 3/2004 | Porras et al. |
| 6,732,179 B1 | 5/2004 | Brown et al. |
| 6,735,691 B1 | 5/2004 | Capps et al. |
| 6,757,740 B1 | 6/2004 | Parekh et al. |
| 6,785,252 B1 | 8/2004 | Zimmerman et al. |
| 6,789,110 B1 | 9/2004 | Short et al. |
| 6,804,783 B1 | 10/2004 | Wesinger et al. |
| 6,823,385 B2 | 11/2004 | McKinnon et al. |
| 6,917,622 B2 | 7/2005 | McKinnon et al. |
| 7,013,331 B2 | 3/2006 | Das |
| 7,120,934 B2 | 10/2006 | Ishikawa |
| 7,143,283 B1 | 11/2006 | Chen et al. |
| 7,146,639 B2 | 12/2006 | Bartal et al. |
| 7,181,017 B1 | 2/2007 | Nagel et al. |
| 7,185,368 B2 | 2/2007 | Copeland, III |
| 7,266,754 B2 | 9/2007 | Shah et al. |
| 7,272,646 B2 | 9/2007 | Cooper et al. |
| 7,324,947 B2 | 1/2008 | Jordan et al. |
| 7,325,042 B1 | 1/2008 | Soscia et al. |
| 7,406,530 B2 | 7/2008 | Brown et al. |
| 7,420,956 B2 | 9/2008 | Karaoguz et al. |
| 2001/0038639 A1 | 11/2001 | McKinnon et al. |
| 2001/0038640 A1 | 11/2001 | McKinnon et al. |
| 2001/0038645 A1 | 11/2001 | McKinnon et al. |
| 2001/0039576 A1 | 11/2001 | Kanada |
| 2001/0039582 A1 | 11/2001 | McKinnon et al. |
| 2002/0013844 A1 | 1/2002 | Garrett et al. |
| 2002/0021665 A1 | 2/2002 | Bhagavath et al. |
| 2002/0023160 A1 | 2/2002 | Garrett et al. |
| 2002/0029260 A1 | 3/2002 | Dobbins et al. |
| 2002/0035699 A1 | 3/2002 | Crosbie |
| 2002/0042883 A1 | 4/2002 | Roux et al. |
| 2002/0046264 A1 | 4/2002 | Dillon et al. |
| 2002/0052950 A1 | 5/2002 | Pillai et al. |
| 2002/0055968 A1 | 5/2002 | Wishoff et al. |
| 2002/0059408 A1 | 5/2002 | Pattabhiraman et al. |
| 2002/0075844 A1 | 6/2002 | Hagen |
| 2002/0085719 A1 | 7/2002 | Crosbie |
| 2002/0087713 A1 | 7/2002 | Cunningham |
| 2002/0090089 A1 | 7/2002 | Branigan et al. |
| 2002/0091944 A1 | 7/2002 | Anderson et al. |
| 2002/0112183 A1 | 8/2002 | Baird, III et al. |
| 2002/0112186 A1 | 8/2002 | Ford et al. |
| 2002/0120741 A1 | 8/2002 | Webb et al. |
| 2002/0123335 A1 | 9/2002 | Luna et al. |
| 2002/0124078 A1 | 9/2002 | Conrad |
| 2002/0124103 A1 | 9/2002 | Maruyama et al. |
| 2002/0129143 A1 | 9/2002 | McKinnon, III et al. |
| 2002/0131404 A1 | 9/2002 | Mehta et al. |
| 2002/0133581 A1 | 9/2002 | Schwartz et al. |
| 2002/0133589 A1 | 9/2002 | Gubbi et al. |
| 2002/0136226 A1 | 9/2002 | Christoffel et al. |
| 2002/0138762 A1 | 9/2002 | Horne |
| 2002/0138763 A1 | 9/2002 | Delany et al. |
| 2002/0143964 A1 | 10/2002 | Guo et al. |
| 2002/0152284 A1 | 10/2002 | Cambray et al. |
| 2002/0162030 A1 | 10/2002 | Brezak et al. |
| 2002/0164952 A1 | 11/2002 | Singhai et al. |
| 2002/0165990 A1 | 11/2002 | Singhai et al. |
| 2002/0169867 A1 | 11/2002 | Mann et al. |
| 2002/0174227 A1 | 11/2002 | Hartsell et al. |
| 2002/0178282 A1 | 11/2002 | Mysore et al. |
| 2002/0199007 A1 | 12/2002 | Clayton et al. |
| 2003/0041104 A1 | 2/2003 | Wingard et al. |
| 2003/0043846 A1 | 3/2003 | Purpura et al. |
| 2003/0046370 A1 | 3/2003 | Courtney |
| 2003/0055994 A1 | 3/2003 | Herrmann et al. |
| 2003/0059038 A1 | 3/2003 | Meyerson et al. |
| 2003/0061506 A1 | 3/2003 | Cooper et al. |
| 2003/0069956 A1 | 4/2003 | Gieseke et al. |
| 2003/0070170 A1 | 4/2003 | Lennon |
| 2003/0078784 A1 | 4/2003 | Jordan et al. |
| 2003/0087629 A1 | 5/2003 | Juitt et al. |
| 2003/0126608 A1 | 7/2003 | Safadi et al. |
| 2003/0135753 A1 | 7/2003 | Batra et al. |
| 2003/0149751 A1 | 8/2003 | Bellinger et al. |
| 2003/0154399 A1 | 8/2003 | Zuk et al. |
| 2003/0159072 A1 | 8/2003 | Bellinger et al. |
| 2003/0163603 A1 | 8/2003 | Fry et al. |
| 2003/0172167 A1 | 9/2003 | Judge et al. |
| 2003/0177477 A1 | 9/2003 | Fuchs |
| 2003/0212800 A1 | 11/2003 | Jones et al. |
| 2003/0217126 A1 | 11/2003 | Polcha et al. |
| 2004/0015719 A1 | 1/2004 | Lee et al. |
| 2004/0047356 A1 | 3/2004 | Bauer |
| 2004/0049586 A1 | 3/2004 | Ocepek et al. |
| 2004/0064836 A1 | 4/2004 | Ludvig et al. |
| 2004/0073941 A1 | 4/2004 | Ludvig et al. |
| 2004/0085906 A1 | 5/2004 | Ohtani et al. |
| 2004/0093513 A1 | 5/2004 | Cantrell et al. |
| 2004/0103426 A1 | 5/2004 | Ludvig et al. |
| 2004/0122956 A1 | 6/2004 | Myers et al. |
| 2004/0172557 A1 | 9/2004 | Nakae et al. |
| 2004/0177276 A1 | 9/2004 | MacKinnon et al. |
| 2004/0179822 A1 | 9/2004 | Tsumagari et al. |
| 2004/0181816 A1 | 9/2004 | Kim et al. |
| 2004/0199635 A1 | 10/2004 | Ta et al. |
| 2004/0210633 A1 | 10/2004 | Brown et al. |
| 2004/0268234 A1 | 12/2004 | Sampathkumar et al. |
| 2005/0021686 A1 | 1/2005 | Jai et al. |
| 2005/0044350 A1 | 2/2005 | White et al. |
| 2005/0044422 A1 | 2/2005 | Cantrell et al. |
| 2005/0091303 A1 | 4/2005 | Suzuki |
| 2005/0138416 A1 | 6/2005 | Qian et al. |
| 2005/0149721 A1 | 7/2005 | Lu et al. |

| | | |
|---|---|---|
| 2005/0193103 A1 | 9/2005 | Drabik |
| 2005/0195854 A1 | 9/2005 | Agmon et al. |
| 2005/0204022 A1 | 9/2005 | Johnston et al. |
| 2005/0204031 A1 | 9/2005 | Johnston et al. |
| 2005/0204050 A1 | 9/2005 | Turley |
| 2005/0204168 A1 | 9/2005 | Johnston et al. |
| 2005/0204169 A1 | 9/2005 | Tonnesen |
| 2005/0204402 A1 | 9/2005 | Turley et al. |
| 2006/0036723 A1 | 2/2006 | Yip et al. |
| 2006/0168229 A1 | 7/2006 | Shim et al. |
| 2006/0173992 A1 | 8/2006 | Weber et al. |
| 2006/0184618 A1 | 8/2006 | Kurup et al. |
| 2007/0073718 A1 | 3/2007 | Ramer et al. |
| 2007/0186113 A1 | 8/2007 | Cuberson et al. |
| 2007/0208936 A1 | 9/2007 | Robles |
| 2007/0268878 A1 | 11/2007 | Clements |
| 2008/0066096 A1 | 3/2008 | Wollmershauser et al. |
| 2008/0120661 A1 | 5/2008 | Ludvig et al. |
| 2008/0147840 A1 | 6/2008 | Roelens et al. |
| 2008/0276305 A1 | 11/2008 | Chan et al. |

FOREIGN PATENT DOCUMENTS

| | | |
|---|---|---|
| WO | WO 01/77787 A3 | 10/2001 |
| WO | WO 02/09458 A2 | 1/2002 |
| WO | WO 02/23825 A1 | 3/2002 |
| WO | WO 02/41587 A2 | 5/2002 |
| WO | WO 02/077820 A1 | 10/2002 |
| WO | WO 03/021890 A1 | 3/2003 |
| WO | WO 03/098461 A1 | 5/2003 |
| WO | WO 2004/034229 A2 | 4/2004 |
| WO | WO 2004/036371 A2 | 4/2004 |
| WO | WO 2005/020035 A2 | 3/2005 |

OTHER PUBLICATIONS

Sommerlad, "Reverse Proxy Patterns", 2003, Retrieved from the Internet on Jul. 15, 2009: <URL: http://www.modsecurity.org/archive/ReverseProxy-book-1.pdf>.*
Office Action issued in U.S. Appl. No. 10/922,041, mailed Dec. 6, 2005, White, 10 pages.
Office Action issued in U.S. Appl. No. 10/922,041, mailed Mar. 30, 2006, White, 18 pages.
Office Action issued in U.S. Appl. No. 10/922,041, mailed Aug. 11, 2006, White, 19 pages.
Office Action issued in U.S. Appl. No. 10/922,041, mailed Jan. 30, 2007, White, 20 pages.
Office Action issued in U.S. Appl. No. 10/683,317, mailed Apr. 5, 2007, MacKinnon, 6 pages.
Office Action issued in U.S. Appl. No. 10/687,002, mailed May 2, 2007, Ta, 10 pages.
U.S. Appl. No. 08/816,174, Short et al.
U.S. Appl. No. 09/458,569, Short et al.
U.S. Appl. No. 09/458,602, Pagan et al.
U.S. Appl. No. 09/541,877, Short et al.
U.S. Appl. No. 09/821,565, Ishikawa.
U.S. Appl. No. 09/881,147, Cooper et al.
U.S. Appl. No. 10/000,396, Copeland.
U.S. Appl. No. 10/072,683, Zuk et al.
U.S. Appl. No. 10/195,326, Lee et al.
U.S. Appl. No. 10/236,402, Bauer.
U.S. Appl. No. 10/291,095, Cantrell et al.
U.S Appl. No. 10/469,206, Ohtani et al.
U.S. Appl. No. 10/641,494, Valluri.
U.S. Appl. No. 10/643,864, Nakae et al.
U.S. Appl. No. 10/709,423, Lu et al.
U.S. Appl. No. 10/930,392, Cantrell et al.
U.S. Appl. No. 10/930,922, Cantrell et al.
U.S. Appl. No. 10/953,326, Suzuki.
U.S. Patent Office Action issued Jun. 9, 2008, in U.S. Appl. No. 10/683,317, Richard MacKinnon, 15 pages.
Fan et al., "Distributed Real Time Intrusion Detection System for 3G", 2004, pp. 1566-1570.
Yu et al., "Fuzzy Logic Based Adaptive Congestion Control Scheme for High-Speed Network", Aug. 2004, pp. 389-393.
Hamano et al., A Redirections-Based Defense Mechanism Against Flood-Type Attacks in Large Scale ISP Networks, 2004, pp. 543-547.
Sarolahti, "Congestion Control on Spurious TCP Retransmssion Timeouts," 2003, pp. 682-686.
Estevez-Tapiador et al., "Measuring Normality in HTTP Traffic for Anomaly-Based Intrusion Detection", Jun. 6, 2004, pp. 175-193.
Xing et al., "A Survey of Computer Vulnerability Assessment", Jan. 2004, pp. 1-11.
Wen et al. "Development of a Snort-Based Security Network Management and Real-Time Intrusion Detection System", Feb. 2004, pp. 40-43.
Thottethodi et al., "Exploiting Global Knowledge to Achieve Self-Tuned Congestion Control for K-ary n-cube Networks", Mar. 2004, pp. 257-272.
Trabelsi et al., "Malicious Sniffing Systems Detection Plafform", 2004, pp. 201-207.
Guangzhi et al., "A Framework for Network Vulnerability Analysis", 2002, pp. 289-294.
Albuquerque et al., "Network Border Patrol: Preventing Congestion Collapse and Promoting Fairness in the Internet", Feb. 2004, pp. 173-186.
Wirbel, Loring, "Security Stampede Could Flatten IPSec", Jan. 2004, p. 12.
Macleod, Calum, "Freeing the Shackles with Secure Remote Working", 2003, pp. 66-67.
Fisher, D., "SSL Simplifies VPN Security", Nov. 10, 2003, p. 40.
Conry-Murray, A., "SSL VPNs: Remote Access for the Masses", Oct. 2003, pp. 26-32.
Permeo Supports Microsoft Network Access Protection for Simplified Secure Remote Access; Permeo's Base5 Support for Microsoft Tech. Provides "Zero Touch" Policy Enforcement.
No author, Permeo Drives Out Operational Costs, Simplifies Secure Remote Access, Mar. 28, 2005, pages NA.
No author, "Netilla Lauches SSL VPN for Citrix. (Industry Briefs) (Virtual Private Networks) (Brief Article)," Sep. 20, 2004, p. 43.
Netilla Lauches Secure Gateway Appliance Family of Application-Specific SSL VPN Products; Initial SGA-C Model Provides Secure Remote Access to Citrix MetaFrame Presentation.
No author, "Secure Remote Access (Network Security) (VPN Gateway 4400 Series) (Brief Article)", Mar. 1, 2004, p. 50.
Fortinet and Aventail Deliver Joint Solution for Clientless Remote Access with High-Performance Antivirus Protection; Integrated SSL VPN and Antivirus Offering Provides.
Hamblen, Matt, "Cisco Targets SSL VPN Vendors, Adds Support for Clientless Security Protoccol: Installed Base of VPN Devices May Give it an Edge, Despite Late Entry (News)".
International Search Report and Written Opinion for related International Application No. PCT/US04/29249, Dec. 15, 2005.
Stone, David, "Securing Wireless LANs with VPN," May 2006, pages NA.
Hamzeh, et al., "Point-to-Point Tunneling Protocol—PPTP RFC 2637" Network Working Group, Jul. 1999, pp. 1-54.
Pfleeger, Charles P., Security in Computing, PTR Prentice-Hall, Inc., 1989, Ch. 10.
International Search Report for PCT/US03/32912, Apr. 8, 2004.
Lingblom, "Cranite Develops SMB Strategy," CRN, San Jose, CA, Jun. 23, 2003.
"Boingo Wireless Service Installed at LaGuardia Airport" Copyright 2003 M2Communications Ltd., found at www.findarticles.com, Dec. 8, 2003, 1 page.
West Point Unwired: the Military Academy at West Point Continues to Lead the Way in High-Tech Curriculum with Wireless Classroom Networking Copyright 2003 M2Communications.
Molta, "Wireless Hotspots Heat Up," Mobile & Wireless Technology feature, pp. 1-8, Copyright 2003 M2Communications Ltd., found at www.networkcomputing.com, printed Dec. 8, 2003.
Jackson, "Wireless at West Point: Officers of the Future Use IT in Class Now, in the Field Later (Technology Report)" Apr. 21, 2003, pp. 1-3, www.gcn.com.

Lingblom, "Bluesocket's New Gateway Based on Open Standards—WGX-4000 Switch Wireless Gateway" CRN, Burlington, MA at www.crn.channelsupersearch.com, Apr. 21, 2003.

Dornan, "Wireless LANs: Freedom vs. Security?" Network Magazine, Jul. 2005, pp. 36-39.

O'Shea, "PCTEL looks past patent suite toward fusion of Wi-Fi, PC" Telephony.online, Jun. 2, 2003, pp. 1-2, found at www.telephonyonline.com.

O'Shea, "Boingo to Launch Initiative Aimed at Carrier Market" Telephony.online, Mar. 10, 2003, 1 page, found at www.telephonyonline.com.

International Search Report from PCT/US03/32268 dated Oct. 29, 2004.

U.S. Patent Office Official Action issued Oct. 9, 2007 in U.S. Appl. No. 10/683,317, Richard MacKinnon, Oct. 9, 2007.

U.S. Patent Office Official Action issued Oct. 18, 2007 in U.S. Appl. No. 10/687,002, Tuan Ta, Oct. 18, 2007.

U.S. Patent Office Official Action issued Oct. 31, 2007 in U.S. Appl. No. 11/078,223, Keith Johnston, Oct. 31, 2007.

SBC Technology Resources, Inc., XNMP-XML Network Management Protocol and Interface, Jul. 19, 2002, pp. 1-9, http://www.ietf.org/proceedings/02jul/slides.

Shim, Choon B., XNMP for IP Telephony Management, Enterprise Networks & Servers, Jun. 2006, pp. 1-7, http://www.enterprisenetworksandservers.com.

Office Action issued in U.S. Appl. No. 11/076,719, dated Sep. 4, 2008, Patrick Turley, 7 pages.

U.S. Patent Office Action issued Aug. 13, 2008, in U.S. Appl. No. 11/076,591, Patrick Turley, 10 pages.

U.S. Patent Office Action issued Jul. 9, 2008, in U.S. Appl. No. 11/076,672, Keith Johnston, 12 pages.

U.S. Patent Office Official Action issued Jul. 13, 2007 in U.S. Appl. No. 10/922,041, Eric White, Jul. 13, 2007.

U.S. Patent Office Action issued Jul. 22, 2008, in U.S. Appl. No. 11/076,652, Steven D. Tonnesen, 8 pages.

U.S. Patent Office Action issued Apr. 17, 2008, in U.S. Appl. No. 10/687,002, Tuan Ta, 13 pages.

Oh et al., Interaction Translation Methods for XML/SNMP Gateway, Jul. 11, 2003, retrieved from . . . (citation continued in next line) . . . http://web-archive.org/web/20030711162412/http://dpnm.postech.ac.kr/paper s/DSOM/02/xml-snmp-gateway/xml-snmp-gateway.pdf, pp. 1-5.

Office Action issued in U.S. Appl. No. 11/076,672 dated Feb. 3, 2009, Johnston, 10 pages.

Office Action issued in U.S. Appl. No. 10/683,317 dated Feb. 11, 2009, MacKinnon, 17 pages.

Office Action issued in U.S. Appl. No. 11/076,591 dated Feb. 13, 2009, Turley, 26 pages.

International Preliminary Report on Patentability in PCT/US03/032268 dated Apr. 10, 2005, 3 pages.

International Preliminary Report on Patentability in PCT/US03/032912 dated Apr. 16, 2005, 3 pages.

International Preliminary Report on Patentability and Written Opinion of the International Searching Authority in PCT/US04/029249 dated Feb. 21, 2006, 6 pages.

Office Action issued in U.S. Appl. No. 11/076,719 dated Mar. 17, 2009, 8 pages.

Office Action issued in U.S. Appl. No. 11/076,652 dated Dec. 11, 2008, Tonnesen, 8 pages.

Office Action issued in U.S. Appl. No. 10/687,002 dated Jan. 7, 2009, Ta, 4 pages.

U.S. Patent Office Official Action issued Jan. 25, 2008 in U.S. Appl. No. 11/076,652, Steven D. Tonnesen, Jan. 25, 2008.

U.S. Patent and Trademark Office, Office Action issued in U.S. Appl. No. 10/922,041, mailed May 8, 2009, White, 13 Pages.

U.S. Patent and Trademark Office, Office Action issued in U.S. Appl. No. 11/076,672, mailed Jul. 21, 2009, White, 11 Pages.

U.S. Patent and Trademark Office, Office Action issued in 11/076,591, mailed Aug. 06, 2009, Turley, 29 pages.

Office Action issued in U.S. Appl. No. 10/683,317, mailed Aug. 18, 2009, 17 pages.

Rashti et al, "A Multi-Dimensional Packet Classifier for NP-Based Firewalls," Jan. 2004, retrieved from the Internet on Aug. 12, 2009: <URL:http://ieeexplore.ieee.org/stamp/stamp.jsp?tp=&arnumber=1266123&isnumber=28312>.

* cited by examiner

SYSTEM AND METHOD FOR DOUBLE-CAPTURE/DOUBLE-REDIRECT TO A DIFFERENT LOCATION

RELATED APPLICATIONS

This application claims priority under 35 U.S.C. 119(e) to U.S. Provisional Patent Application No. 60/551,705 entitled "System and Method for Double-Capture/Double-Redirect to a Different Location," by Keith Johnston, et al., filed Mar. 10, 2004 and U.S. Provisional Patent Application No. 60/551,702 entitled "System and Method For Access Scope Control ("Walled Gardens") For Clients of a Network Access Gateway", by Patrick Turley, Keith Johnston and Steven D. Tonnesen, filed Mar. 10, 2004, which are both hereby fully incorporated by reference herein.

TECHNICAL FIELD OF THE INVENTION

Embodiments of the present invention relate to network access control and security. More particularly, embodiments of the present invention relate to providing access control for a shared network.

BACKGROUND

Network access providers utilizing Access Controlled Network Sharing technology to provide user-specific provisioned access to private/public networks may also have a need to allow controlled access for unauthenticated users to a restricted collection of network destinations.

For example, a shopping mall owner may want to provide any on-site customer possessing a wireless device (such as a laptop computer, PDA, etc.) with access to the Web server for the mall, plus one or more other Web sites that are associated with the mall (e.g., the local Web server for a tenant in the mall, such as a department store or movie theater). The collection of Web servers that the mall owner will allow an anonymous user to visit is referred to as the "walled garden".

In addition, the mall owner may intend to provide unlimited web access to customers who agree to register with the mall owner, and identify themselves (by providing credentials—typically, in the form of a user identifier and a password that were assigned at the time they registered) whenever they wish to be granted full access to the Internet. The process of verifying a customer's credentials is referred to as "authentication".

Previous solutions would either 1) require that the network destination of the authentication service (i.e., the "captive" portal) be specified explicitly in a link on at least one of the web pages within the set of destinations that are members of the "walled garden", or 2) require that the end-user manually enter the web address of the authentication service in the address bar of their web browser.

SUMMARY OF THE INVENTION

The invention is a software-based system and method that enhances the function of a network access controller by introducing a "Pre-Authentication Capture Destination". In the standard Access Controlled Network Sharing solution, an unauthenticated client who attempts to access the network is re-directed to a challenge screen or "captive portal", where they must provide their network login credentials (e.g., user name and password).

If a Pre-Authentication Capture Destination is specified, then this behavior changes. Any attempt by an unauthenticated client to access a network resource that is not in a list of allowed destinations (e.g., the list of servers that make up the "walled garden") will result in the client being re-directed by the Network Access Controller to the Pre-Authentication Capture Destination. The unauthenticated client is then free to visit any of the servers that are included in the walled garden without authentication. Any attempt to access a web site or location that is outside of the walled garden will cause the client to be re-directed back to the Pre-Authentication Capture Destination.

At some point, the unauthenticated client may want to use network access privileges that are only available to an authenticated user. Consequently, the client must then be re-directed to an authentication URL (or "captive" portal), where they may login (or register as a new user). To accomplish this re-direction, at least one of the web sites within the walled garden can include an HTML link that references a site that is not in the walled garden and includes a special token within the "query" portion of the link's target HTTP URL (as defined in the IETF RFC-2616—"Hypertext Transfer Protocol—HTTP/1.1" and RFC-1738 "Uniform Resource Locators (URL)" specifications). This special token, referred to as the "Authentication Token", is a unique sequence of characters that are valid for use in the query portion of a URL. When the client attempts to access the referenced site, they will be captured by the Network Access Controller. However, because of the presence of the Authentication token within the HTTP URL, the Network Access Controller will re-direct the client to the authentication screen, rather than redirecting them back to the Pre-Authentication Capture Destination.

Note that there is no requirement for any web page in the walled garden to have prior knowledge of the actual authentication screen location. Consequently, the same collection of walled garden sites may be used to service multiple Network Access controllers, where each controller may utilize a different authentication portal.

This invention enables a public/private network service provider to automatically redirect anonymous clients to a pre-defined destination within a limited set of network destinations, and provides a mechanism for accessing the authentication service without requiring that the web servers in the "walled garden" know the actual authentication URL. The automatic redirection occurs whenever the anonymous client attempts to access a network destination outside of the allowed set. The anonymous client does not have to enter the network URL of a server in the "walled garden"—instead, they just have to attempt to access any well-known URL (such as www.yahoo.com), and they will be redirected to the pre-defined destination.

BRIEF DESCRIPTION OF THE FIGURES

A more complete understanding of the present invention and the advantages thereof may be acquired by referring to the following description, taken in conjunction with the accompanying drawings in which like reference numbers indicate like features and wherein.

DETAILED DESCRIPTION

Figure 1:
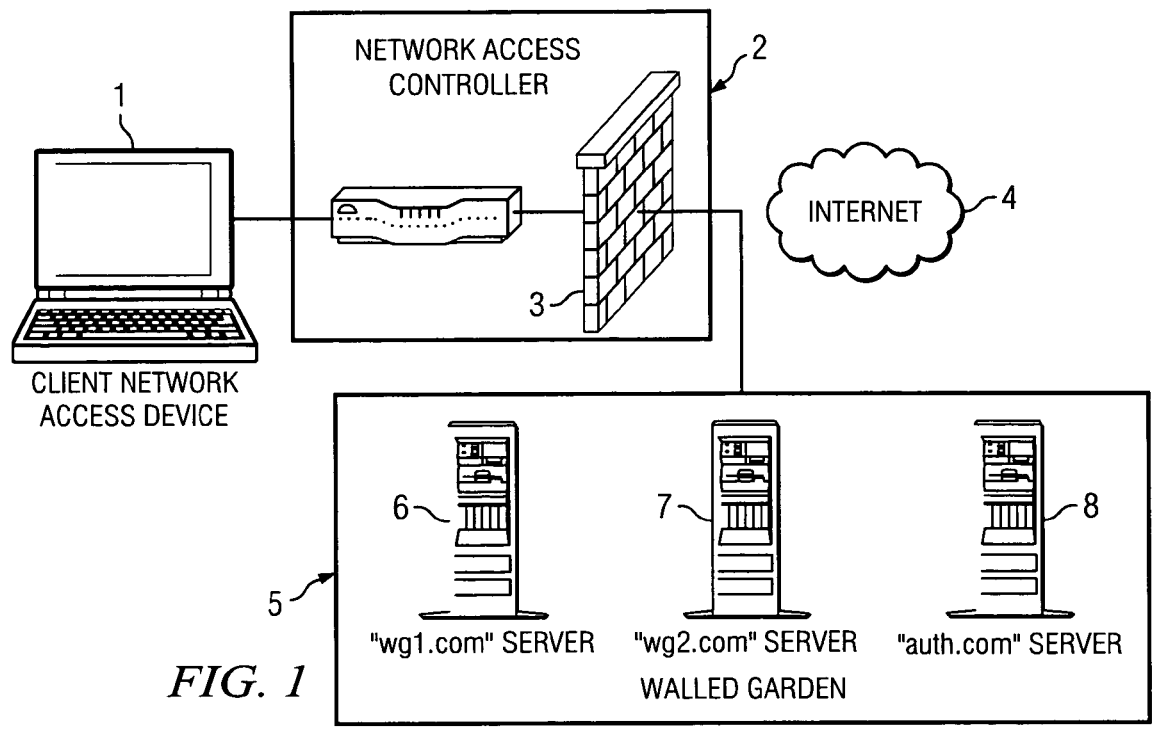
FIG. 1 is a diagrammatic representation of a system depicting the network access capability afforded to an unauthenticated client, according to one embodiment of the present invention.

The following applications are hereby fully incorporated by reference herein in their entirety: U.S. application Ser. No. 10/683,317, filed Oct. 10, 2003, entitled "SYSTEM AND METHOD FOR PROVIDING ACCESS CONTROL," by Richard MacKinnon, Kelly Looney, and Eric White; U.S. Provisional Application No. 60/551,698, filed Mar. 10, 2004, entitled "SYSTEM AND METHOD FOR BEHAVIOR-BASED FIREWALL MODELING," by Patrick Turley which converted into U.S. application Ser. No. 11/076,719, filed Mar. 10, 2005, entitled "SYSTEM AND METHOD FOR BEHAVIOR-BASED FIREWALL MODELING," by Richard MacKinnon, Kelly Looney, and Eric White; U.S. Provisional Application No. 60/551,754, filed Mar. 10, 2004, entitled "SYSTEM AND METHOD FOR COMPREHENSIVE CODE GENERATION FOR SYSTEM MANAGEMENT," by Keith Johnston which converted into U.S. application Ser. No. 11/078,223, filed Mar. 10, 2005, entitled "SYSTEM AND METHOD FOR COMPREHENSIVE CODE GENERATION FOR SYSTEM MANAGEMENT," by Keith Johnston; U.S. Provisional Application No. 60/551,703, filed Mar. 10, 2004, entitled "SYSTEM AND METHOD FOR PROVIDING A CENTRALIZED DESCRIPTION/CONFIGURATION OF CLIENT DEVICES ON A NETWORK ACCESS GATEWAY," by Patrick Turley and Keith Johnston; U.S. Provisional Application No. 60/551,702, filed Mar. 10, 2004, entitled "SYSTEM AND METHOD FOR ACCESS SCOPE CONTROL ("WALLED GARDENS") FOR CLIENTS OF A NETWORK ACCESS GATEWAY," by Patrick Turley, Keith Johnston, and Steven D. Tonnesen which converted into U.S. application Ser. No. 11/076,591, filed Mar. 10, 2005, entitled "METHOD AND SYSTEM FOR CONTROLLING NETWORK ACCESS," by Patrick Turley, Keith Johnston, and Steven D. Tonnesen; U.S. Provisional Application No. 60/551,699, filed Mar. 10, 2004, entitled "SYSTEM AND METHOD FOR DYNAMIC BANDWIDTH CONTROL," by Patrick Turley, et al.; U.S. Provisional Application No. 60/551,697, filed Mar. 10, 2004, entitled "SYSTEM AND METHOD FOR DETECTION OF ABERRANT NETWORK BEHAVIOR BY CLIENTS OF A NETWORK ACCESS GATEWAY," by Steven D. Tonnesen which converted into U.S. application Ser. No. 11/076,652, filed Mar. 10, 2005, entitled "SYSTEM AND METHOD FOR DETECTION OF ABERRANT NETWORK BEHAVIOR BY CLIENTS OF A NETWORK ACCESS GATEWAY," by Steven D. Tonnesen; U.S. Provisional Application No. 60/551,704, filed Mar. 10, 2004, entitled "SYSTEM AND METHOD FOR NETWORK MANAGEMENT XML ARCHITECTURAL ABSTRACTION," by Keith Johnston and Mario Garcia which converted into U.S. application Ser. No. 11/076,672, filed Mar. 10, 2005, entitled "SYSTEM AND METHOD FOR NETWORK MANAGEMENT XML ARCHITECTURAL ABSTRACTION," by Keith Johnston and Mario Garcia; and U.S. Provisional Application No. 60/660,408 filed Mar. 10, 2005, entitled "SYSTEM AND METHOD FOR PROVIDING A CENTRALIZED DESCRIPTION/CONFIGURATION OF CLIENT DEVICES ON A NETWORK ACCESS GATEWAY," by Patrick Turley, et al.

Preferred embodiments of the invention are illustrated in the FIGURES, like numerals being used to refer to like and corresponding parts of the various drawings.

Network access providers utilizing Access Controlled Network Sharing (as, for example, described in U.S. patent application Ser. No. 10/683,317, filed Oct. 10, 2003, entitled "System and Method for Providing Access Control", by Richard MacKinnon, Kelly Looney, and Eric White) technology to provide user-specific provisioned access to private/public networks may also have a need to allow controlled access for unauthenticated users to a restricted collection of network destinations (this can be referred to as the "walled garden"—see U.S. Provisional Patent Application No. 60/551,702 entitled "System and Method for Access Scope Control ("Walled Gardens") for Clients of a Network Access Gateway" by Patrick Turley, Keith Johnston and Steven D. Tonnesen, filed Mar. 10, 2004, converted into U.S. patent application Ser. No. 11/076,591, entitled "Method and System for Controlling Network Access" by Patrick Turley, Keith Johnston and Steven D. Tonnesen, filed Mar. 10, 2005).

To illustrate this invention, assume that the following configuration has been set in the Network Access Controller 2, as depicted in FIG. 1:

Walled Garden 5 contains three servers:
wg1.com (Server 6)
wg2.com (Server 7)
auth.com (Server 8)

The Pre-Authentication Capture Destination for the embodiment of FIG. 1 will be designated http://wg1.com/welcome.html.

The Authentication Capture Destination is https://auth.com/login.jsp.

As shown in the embodiment of FIG. 1, assume that an anonymous user has access to one of the Client network access devices 1. This user launches a Web browser and enters "www.yahoo.com" (an "external" URL, i.e., a destination that is not in the Walled Garden 5) in the address bar, and presses <Return>. The Network Access Controller 2 uses its internal Firewall 3 function to recognize the attempt by an unknown user to access an "external" location (represented by the Internet cloud 4 in FIG. 1), intercepts the request, and sends an HTTP redirect to the Client's browser, specifying the Pre-Authentication Capture URL "http://wg1.com/welcome.html". The browser then automatically performs an HTTP Get to retrieve that Web page from the wg1.com server.

At this point, the anonymous user may access Web locations on any of the three servers that are in the Walled Garden 5. For this example, assume that the Web pages on the wg1.com Server 6 include links to Web pages on the wg2.com Server 7. The anonymous user would be able to click on any of these links and view the referenced pages hosted on Server 7. However, if one of these Web pages contained a link to an "external" web site, and the user clicked on that link, then the Network Access Controller 2 would again redirect the Client's browser back to the Pre-Authentication Capture URL http://wg1.com/welcome.html, hosted on Server 6.

Now, assume that the anonymous user decides that they want to be authenticated, so that they may be allowed access to an "external" network destination. To enable the user to login, an HTML link is included on the welcome page at "http://wg1.com/welcome.html". The link's reference URL identifies a server that is outside of the Walled Garden 5, and includes the special token string "proceedToAuthenticationURL=true" within the query portion. (Note that the exact form of this special token need not be predefined; the special token is simply uniquely identifiable.)

When the user clicks on this link, the Network Access Controller 2 intercepts the request. However, instead of redirecting the Client's browser to the Pre-Authentication Capture URL, the Network Access Controller 2 recognizes the presence of the token, and redirects the browser to the Authentication URL http://auth.com/login.jsp, hosted on the "auth.com" Server 8.

At this point, the user is presented with a Login page, and enters a username/password. Assuming that these credentials are valid, the "auth.com" Server 8 sends an "authorize" command to the Network Access Controller 2. This command instructs the Network Access Controller 2 to allow "external" access for the authenticated user.

Figure 2:
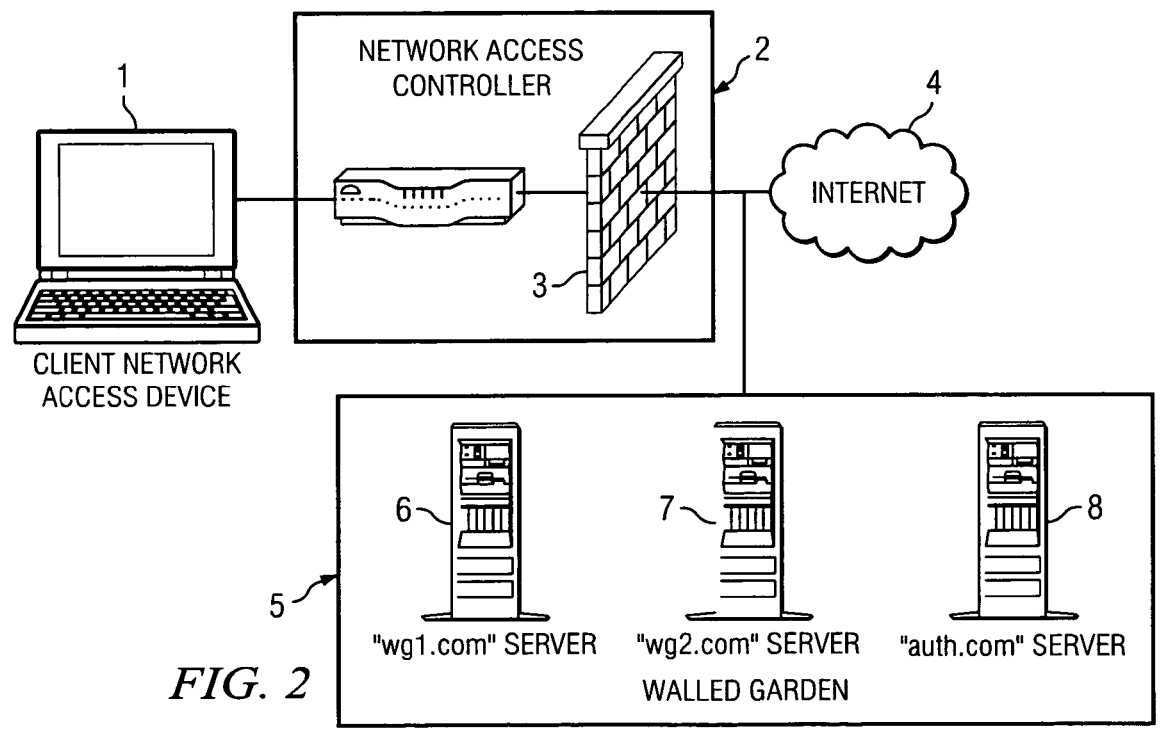
FIG. 2 is a diagrammatic representation of a system depicting the network access capability afforded to an authenticated client, according to one embodiment of the present invention.

As shown in FIG. 2, the Client now has access to the Internet 4 ("External Network"). If the user now entered "www.yahoo.com" in the Web browser's address bar, the Network Access Controller 2 would no longer intercept this request, and the welcome page from the Yahoo web site would be displayed.

Note that in one embodiment, this "external" access is only granted to the authenticated user. An anonymous user on a different Client would still be restricted to the Walled Garden 5.

Figure 3:
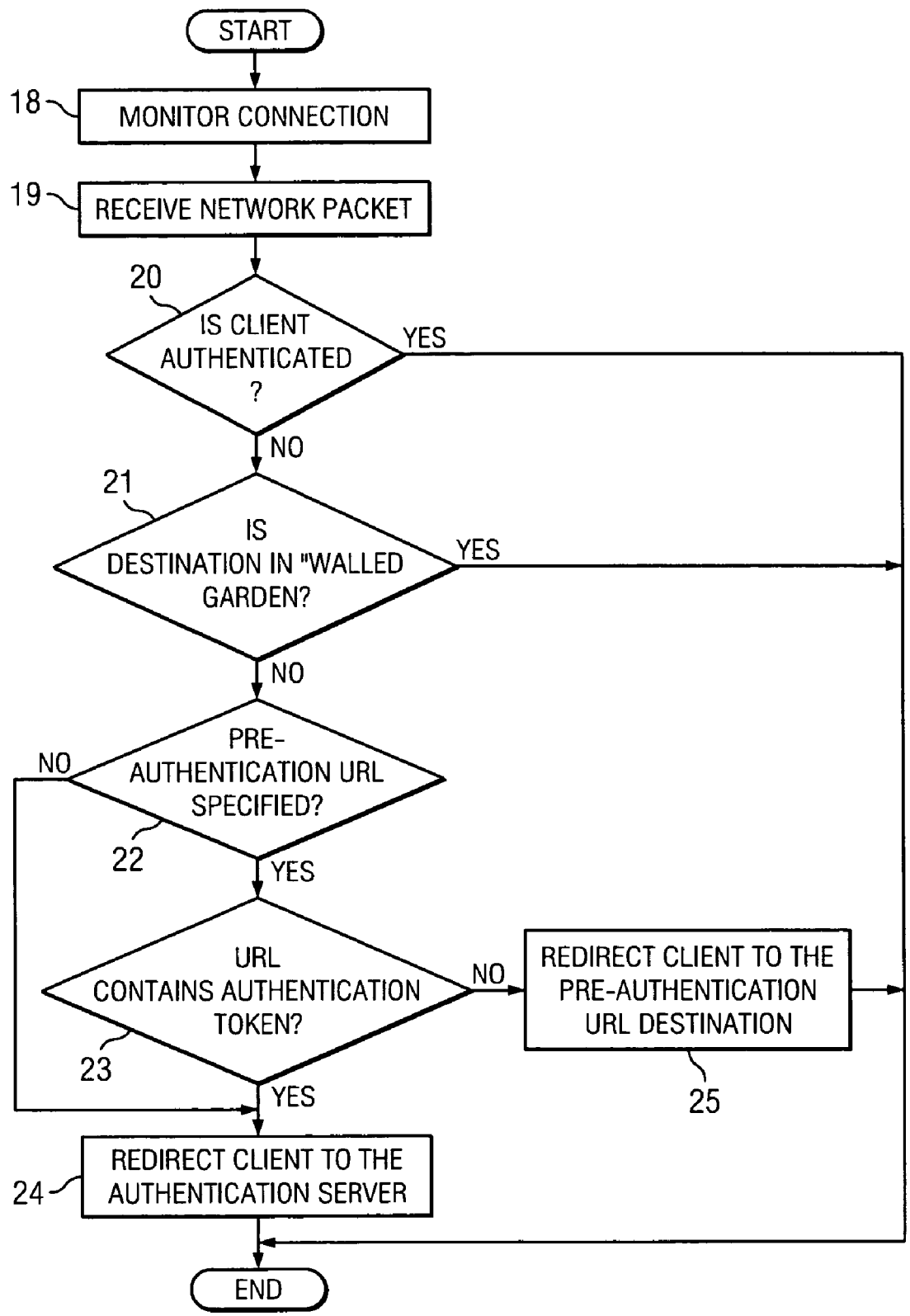
FIG. 3 is a diagrammatic representation of the flow of control (decision diagram) for a network access sharing device implementing the double-capture, double-redirect method, according to one embodiment of the present invention.

One embodiment of the decision logic (and associated flow) that can be executed by the Network Access Controller 2 is depicted in FIG. 3. The Network Access Controller continuously monitors for network access from network access client devices 1 on its first network interface at step 18.

When a network packet is received (step 19), the Network Access Controller 2 determines if the packet is being sent by an authenticated client (step 20).

If the packet is from an authenticated client, then the Network Access Controller 2 allows the packet to pass through and be routed to its target destination ("Yes" decision fork).

If the packet is from an unauthenticated client, then the Network Access Controller 2 determines if the destination of the packet is one of the servers within the Walled Garden 5 (step 21).

If the packet is from an unauthenticated client and the destination is a server in the Walled Garden 5, then the Network Access Controller 2 allows the packet to pass through and be routed to its target server ("Yes" decision fork).

If the packet is from an unauthenticated client and the destination is not a server in the Walled Garden 5, then the Network Access Controller 2 determines if a Pre-Authentication URL has been specified (step 22).

If the packet is from an unauthenticated client, the destination is not a server in the Walled Garden 5, and a Pre-Authentication URL has not been specified, then the Network Access Controller directs the client to the Authentication URL (step 24).

If the packet is from an unauthenticated client, the destination is not a server in the Walled Garden 5, and a Pre-Authentication URL has been specified, then the Network Access Controller 2 determines if the packet contains the Authentication Token (step 23).

If the packet is from an unauthenticated client, the destination is not a server in the Walled Garden 5, a Pre-Authentication URL has been specified, and the packet does not contain the Authentication Token, then the Network Access Controller 2 directs the client to the Pre-Authentication URL (step 25).

If the packet is from an unauthenticated client, the destination is not a server in the Walled Garden 5, a Pre-Authentication URL has been specified, and the packet contains the Authentication Token, then the Network Access Controller 2 directs the client to the Authentication URL (step 24).

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed in the following claims.

What is claimed is:

1. A system of providing network access comprising:
   a processor;
   a first network interface coupled to the processor;
   a second network interface coupled to the processor;
   a storage media accessible by the processor;
   a set of computer instructions executable by the processor to:
      receive a network communication at the first network interface from a device associated with a user;
      determine if the network communication is associated with an authenticated user; and
      if the network communication is not associated with an authenticated user, does not identify an address within a walled garden, and a pre-authentication URL is not specified,
         direct the user to an authentication interface;
         receive credentials from the user;
         authenticate the user based on the credentials; and
         receive a user profile if the user is authenticated;
   wherein the set of computer instructions are further executable by the processor to:
      intercept an unauthenticated client access to a server outside of the walled garden;
      determine whether an authentication token is present in the client request;
      direct the client to an authentication URL if the authentication token is present; and
      direct the client to the pre-authentication URL if the authentication token is not present.

2. The system of claim 1, wherein the computer instructions are further operable to grant access for an unauthenticated client to any destination server within the walled garden.

3. The system of claim 2, wherein the computer instructions are further operable to redirect an unauthenticated client to the pre-authentication URL destination, when such destination has been specified.

4. The system of claim 3, wherein the network communication comprises an HTTP request and wherein the computer instructions are further executable to:
   receive the HTTP request; and
   send a redirect request to the device to redirect a web browser to the authentication interface.

5. The system of claim 2, wherein the computer instructions are further executable to:
   determine a network protocol for the network communication; and
   send a reply to the device according to the network protocol directing the user to the authentication interface.

6. The system of claim 5, wherein the network protocol is one of HTTP, SMTP, POP, telnet, UDP or FTP.

* * * * *